United States Patent
Higashimoto

(10) Patent No.: US 9,071,751 B2
(45) Date of Patent: Jun. 30, 2015

(54) IMAGE PROCESSOR METHOD AND PROGRAM FOR CORRECTING DISTANCE DISTORTION IN PANORAMA IMAGES

(75) Inventor: Kimu Higashimoto, Tokyo (JP)

(73) Assignee: SONY CORPORATION, Tokyo (JP)

( * ) Notice: Subject to any disclaimer, the term of this patent is extended or adjusted under 35 U.S.C. 154(b) by 175 days.

(21) Appl. No.: 13/419,785

(22) Filed: Mar. 14, 2012

(65) Prior Publication Data

US 2012/0243746 A1    Sep. 27, 2012

(30) Foreign Application Priority Data

Mar. 22, 2011   (JP) .................................. 2011-062175

(51) Int. Cl.
 *G06K 9/36*   (2006.01)
 *H04N 5/232*   (2006.01)

(52) U.S. Cl.
 CPC .................................. *H04N 5/23238* (2013.01)

(58) Field of Classification Search
 CPC ....................................................... G06K 9/36
 USPC ............................................................ 382/284
 See application file for complete search history.

(56) References Cited

U.S. PATENT DOCUMENTS

| | | | |
|---|---|---|---|
| 2002/0154812 A1* | 10/2002 | Chen et al. | 382/154 |
| 2004/0119868 A1* | 6/2004 | Kim | 348/333.01 |
| 2005/0185070 A1* | 8/2005 | Cheatle | 348/239 |
| 2006/0062487 A1* | 3/2006 | Ouchi | 382/284 |
| 2007/0122058 A1* | 5/2007 | Kitaura et al. | 382/284 |
| 2008/0252717 A1* | 10/2008 | Moon et al. | 348/36 |
| 2008/0298674 A1* | 12/2008 | Baker et al. | 382/154 |
| 2009/0022422 A1* | 1/2009 | Sorek et al. | 382/284 |
| 2010/0134621 A1* | 6/2010 | Namkoong et al. | 348/143 |
| 2011/0193941 A1* | 8/2011 | Inaba et al. | 348/46 |
| 2012/0189167 A1* | 7/2012 | Kurata et al. | 382/107 |

FOREIGN PATENT DOCUMENTS

| | | | | | |
|---|---|---|---|---|---|
| JP | 2004-122176 A | | 4/2004 | | |
| JP | 2010-227582 A | | 10/2010 | | |
| WO | WO 2004068865 A1 * | | 8/2004 | ............. | H04N 13/00 |

* cited by examiner

*Primary Examiner* — Stephen R Koziol
*Assistant Examiner* — Delomia Gilliard
(74) *Attorney, Agent, or Firm* — Hazuki International, LLC

(57) ABSTRACT

An image processor includes a synthesis processing unit adapted to generate a panoramic image by clipping images from a plurality of captured images and connecting the clipped images together and a processing unit adapted to correct image distortions of a subject in the panoramic image due to varying distances to the subject by modifying the panoramic image on the basis of distance information obtained by measuring the distances to a plurality of positions of the subject.

20 Claims, 11 Drawing Sheets

FIG. 7

| POSITION | DISTANCE FROM LEFT END | DISTANCE LM TO SUBJECT |
|---|---|---|
| PS0 |  | LM(max) = 10 |
|  | D1 | 8 |
|  | D2 | 7 |
|  | D3 | 6 |
|  | D4 | 5 |
| PS5 | D5 | 5 |
|  | D6 | 6 |
|  | D7 | 7 |
|  | D8 | 8 |
|  | D9 | 9 |
| PS10 | D10 | 10 |

IMAGE PROCESSOR METHOD AND PROGRAM FOR CORRECTING DISTANCE DISTORTION IN PANORAMA IMAGES

BACKGROUND

The present technology relates to an image processor, an image processing method, and a program. In particular, the present technology facilitates the generation of wide-angle synthetic images with image distortions corrected.

In the related art, a plurality of imaging operations are performed while an imaging apparatus is swung or translated and the captured images are connected to generate a panoramic image, i.e., a synthesized image covering a wider angle of view than an image obtained by a single imaging operation.

For generating the panoramic image, geometric displacements due to photographic lens aberration, parallax, etc., are corrected when the image is synthesized as in Japanese Unexamined Patent Application Publication No. 8-116490 for example. In Japanese Unexamined Patent Application Publication No. 8-116490, an image is synthesized using images in which parallax has been corrected on the basis of the amount of parallax calculated from distance information of the distances to the subject.

In Japanese Unexamined Patent Application Publication No. 2009-260567, distortions are corrected in accordance with photographic conditions or use of images. For creating a panoramic image by connecting a plurality of captured image data together, for example, distortions are corrected in accordance with the focal length of the lens at the time of imaging and the images with distortions corrected are connected together. When a wide-angle image is captured using a wide-angle lens, correction is made leaving marginal distortions because images with marginal distortions may look more natural than those without marginal distortions.

SUMMARY

When the cylindrical projection method is employed to generate a panoramic image, an imaging apparatus is rotated at a fixed position to generate a plurality of captured images and then the generated images are connected together.

FIGS. 1A to 1D illustrate the cylindrical projection method. The cylindrical projection method assumes that the distance from the imaging apparatus to the subject is constant at all times. When the distances from the imaging apparatus 90 to the subjects 91 are constant as shown in FIG. 1A and the subjects 91 are identical in size, the subject images 91$p$ appear in the same size in a captured image as shown in FIG. 1B. On the other hand, when the distances from the imaging apparatus to the subject vary, image distortions occur in accordance with the distances to the subject. For example, suppose that a segment LN1 extending from the imaging apparatus 90 to one end point P1 of a first captured image 94 on a cylindrical surface 93 intersects a plane 96 at a intersection point P1' as shown in FIG. 1C. A segment LN2 extending from the position of the imaging apparatus 90 to the other end point P2 of the first captured image 94 intersects the plane 96 at a intersection point P2'. Similarly, suppose that a segment LN3 extending from the position of the imaging apparatus 90 to one end point P3 of a second captured image 95 on the cylindrical surface 93 intersects the plane 96 at a intersection point P3'. A segment LN4 extending from the position of the imaging apparatus 90 to the other end point P4 of the second captured image 95 intersects the plane 96 at a intersection point P4'. In this case, the first captured image 94 represents the range extending between the intersection points P1' and P2' on the plane 96. Similarly, the second captured image 95 represents the range extending between the intersection points P3' and P4' on the plane 96. The distance from the position of the imaging apparatus 90 to the intersection point P1' is longer than the distance from the position of the imaging apparatus 90 to the intersection point P2', and the distance from the position of the imaging apparatus 90 to the intersection point P4' is longer than the distance from the position of the imaging apparatus 90 to the intersection point P3'. Consequently, the subject 92 on the plane 96 becomes a barrel-like distorted subject image 92$p$ as shown in FIG. 1D.

Since the cylindrical projection method is an imaging method assuming that the distance from the imaging apparatus to the subject is constant at all times, a subject located at varying distances from the imaging apparatus appears distorted on a captured image in accordance with the distances. It is difficult, however, to correct these distortions due to varying distances from the imaging apparatus by correcting the geometric displacements due to imaging lens aberration and parallax as in Japanese Unexamined Patent Application Publication No. 8-116490 or by correcting distortions in accordance with the focal length of the lens as in Japanese Unexamined Patent Application Publication No. 2009-260567.

It is desirable to provide an image processor, an image processing method, and a program that can facilitate the generation of a wide-angle synthetic image in which image distortions due to varying distances from an imaging apparatus have been corrected.

An embodiment of the present technology is an image processor including a synthesis processing unit that generates a panoramic image by clipping images from a plurality of captured images and connecting the clipped images together and a processing unit that corrects image distortions of a subject in the panoramic image due to varying distances to the subject by modifying the panoramic image on the basis of distance information obtained by measuring the distances to a plurality of positions of the subject.

In the embodiment of the present technology, a plurality of images are captured using the cylindrical projection method. A wide-angle synthetic image is generated by clipping images from the plurality of captured images and connecting the clipped images together. Image distortions of the subject in the synthetic image due to varying distances are corrected by reducing or enlarging the synthetic image on the basis of distance information of the distances to the subject measured at a plurality of positions of the subject, such as a plurality of positions in the direction in which the clipped images are connected together, for example. When the synthetic image is to be reduced, the reduction ratio of the synthetic image is increased as the distance information becomes shorter from the longest distance. Regions without image information produced as a result of the reduction of the synthetic image are converted to predetermined images. Alternatively, a rectangular image is clipped from the reduced synthetic image by removing the regions without image information. When the synthetic image is to be enlarged, the enlargement ratio of the synthetic image is increased as the distance information becomes longer from the shortest distance. On a display unit on which images are displayed, both the synthetic image and the synthetic image with distortions corrected are displayed such that either one of the synthetic images can be selected.

Another embodiment of the present technology is an image processing method including generating a panoramic image by clipping images from a plurality of captured images and connecting the clipped images together, and correcting image distortions of a subject in the panoramic image due to varying distances to the subject by modifying the panoramic image on the basis of the distance information obtained by measuring the distances to a plurality of positions of the subject.

Still another embodiment of the present technology is a program for causing a computer to perform image processing for generating a wide-angle panoramic image from a plurality of captured images, the program including generating the panoramic image by clipping images from a plurality of captured images and connecting the clipped images together, and correcting image distortions of a subject in the panoramic image due to varying distances to the subject by modifying the panoramic image on the basis of the distance information obtained by measuring the distances to a plurality of positions of the subject.

The program according to the embodiment of the present technology is a program that can be provided to a general-purpose computer capable of executing various programs, in a computer-readable form in a recording medium such as an optical disc, magnetic disc, semiconductor memory, or any other recording medium, or through a communication medium such as a network, for example. Once such a program is provided in a computer-readable form, processing is performed on the computer system according to the program.

According to the embodiments of the present technology, a synthetic image is generated by clipping images from a plurality of captured images and connecting the clipped images together. Distortions of a subject in the synthetic image due to varying distances are corrected by modifying the synthetic image on the basis of the distance information obtained by measuring the distances to a plurality of positions of the subject. Accordingly, the embodiments of the present technology allow wide-angle synthetic images to be generated easily in which image distortions due to varying distances from the imaging apparatus have been corrected.

BRIEF DESCRIPTION OF THE DRAWINGS

FIG. 7 shows exemplary distances between the imaging apparatus and the subject;

DETAILED DESCRIPTION OF EMBODIMENTS

Embodiments of the present technology will now be described. The description will be given in the following order:

1. Configuration of an imaging apparatus in which an image processor is employed
2. Operations of the imaging apparatus in which the image processor is employed
3. Other operations of the imaging apparatus in which the image processor is employed <1. Configuration Of An Imaging Apparatus In Which An Image Processor Is Employed>

Figure 2:
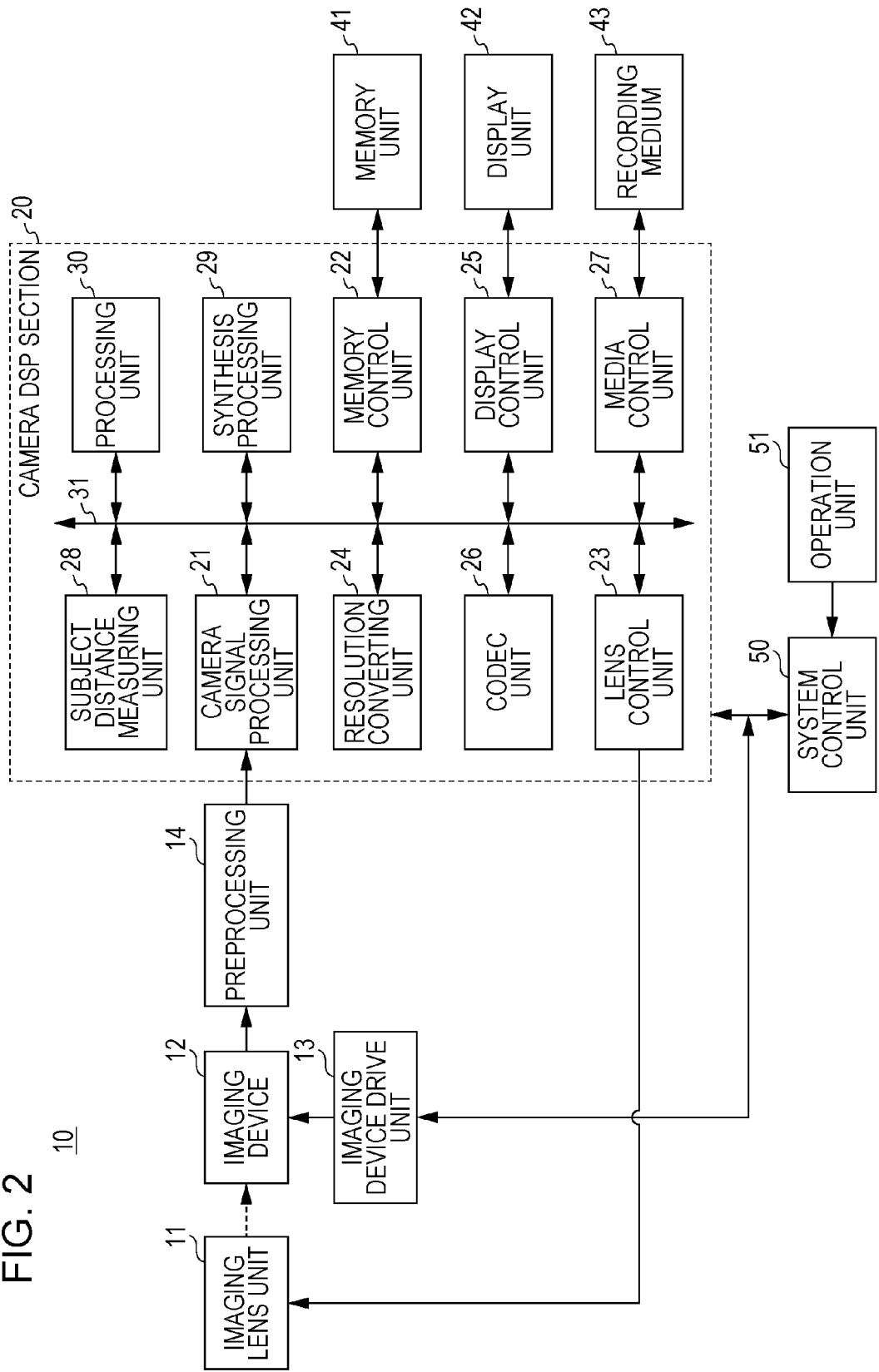
FIG. 2 shows a configuration of an imaging apparatus in which an image processor is employed.

FIG. 2 illustrates a configuration of an imaging apparatus 10 in which the image processor according to an embodiment of the present technology is employed. The imaging apparatus 10 includes an imaging lens unit 11, imaging device 12, imaging device drive unit 13, preprocessing unit 14, camera DSP (digital signal processing) section 20, memory unit 41, display unit 42, recording medium 43, system control unit 50, and operation unit 51.

The imaging lens unit 11 functions as an imaging optical system for guiding light from a subject to the imaging device 12. The imaging lens unit 11 includes a focus lens for adjusting the focus of an optical image formed on the imaging surface of the imaging device 12 and a zoom lens for scaling the optical image.

The imaging device 12 is configured with a solid-state imaging device such as a CMOS (complementary metal-oxide semiconductor), CCD (charge coupled device), or the like. The imaging device 12 generates an imaging signal in accordance with an optical image formed on the light-receiving surface by the imaging lens unit 11 and outputs the generated imaging signal to the preprocessing unit 14.

The imaging device drive unit 13 generates and supplies a drive signal to the imaging device 12 to cause the imaging device 12 to generate and output the imaging signal.

The preprocessing unit 14 generates image data by performing correlated double sampling (CDS), analog amplification, analog-to-digital (A/D) conversion, etc., on the imaging signal supplied from the imaging device 12 and outputs the generated image data to a camera DSP section 20.

Under the control of a system control unit 50 described below, the camera DSP section 20 performs processing including recording and reproducing the image data output from the preprocessing unit 5, displaying an image based on the image data, and generating a wide-angle synthetic image, i.e., a panoramic image. The memory unit 41 is connected to the camera DSP section 20 and serves as a work space for the camera DSP section 20 performing various types of processing.

The camera DSP section 20 includes a camera signal processing unit 21, memory control unit 22, lens control unit 23, resolution converting unit 24, display control unit 25, codec unit 26, media control unit 27, subject distance measuring unit 28, synthesis processing unit 29, and processing unit 30. The units in the camera DSP section 20 are connected to each other through an internal bus 31.

The camera signal processing unit 21 performs white balance adjustment, gamma correction, and other processing on the image data supplied from the preprocessing unit 14. The camera signal processing unit 21 detects from the image data information necessary for aperture correction and auto-focus adjustment and outputs the detected information to the lens control unit 23.

The memory control unit 22 controls data writing and reading from the memory unit 41. The memory control unit 22 writes to the memory unit 41 image data and coded data supplied from the units of the camera DSP section 20 and reads out of the memory unit 41 image data and coded data and outputs the read-out data to the units of the camera DSP section 20.

On the basis of the information obtained from the camera signal processing unit 21 and control signals from the system control unit 50 described below, the lens control unit 23 drives the imaging lens unit 11 to control auto-focus, zooming, aperture, etc.

The resolution converting unit 24 converts the resolution of the image data stored in the memory unit 41 or the image data to be output from the camera signal processing unit 21. For example, the resolution converting unit 24 converts the image data that has undergone the camera signal processing to image data corresponding to the display resolution of the display unit 42. The resolution converting unit 24 also converts the image data to a resolution indicated by the user so that the data can be recorded in the recording medium 43. Furthermore, the resolution converting unit 24 clips a region of a captured image and performs processing related to its resolution conversion to generate image data that has undergone electronic zooming or reproduction zooming.

The display control unit 25 drives the display unit 42 with the image data supplied from the resolution converting unit 24 and/or the image data stored in the memory unit 41 to display monitor images during imaging operations, images recorded in the memory unit 41, and/or images recorded in the recording medium 43. The display control unit 25 also causes the display unit 42 to display a menu for selecting the functions to be mounted on the imaging apparatus 10 and the status of settings of the imaging apparatus 10.

The codec unit 26 compresses image data and outputs the resultant coded data to the memory control unit 22 and/or media control unit 27 to record the coded data in the memory unit 41 and/or recording medium 43. The codec unit 26 also decompresses the coded data read out of the memory unit 41 and/or recording medium 43 and outputs the resultant image data to the memory control unit 22, display control unit 25, etc. For this data compression and decompression of still images, the JPEG (joint photographic coding experts group) scheme is applied. For data compression and decompression of moving pictures, a data compression scheme using motion vectors such as MPEG1 (motion picture experts group 1), MPEG2 (motion picture experts group 2), or MPEG4 (motion picture experts group 4) of ISO/IEC JTC1/SC29WG11, H.263 or H.264/MPEG4-AVC (advanced video coding) of ITU-T, etc., is applied.

The memory control unit 22 controls data writing and reading from the memory unit 41. The memory control unit 22 writes to the memory unit 41 the image data and coded data supplied from the units of the camera DSP section 20 and reads and outputs the image data and coded data stored in the memory unit 41 to the units of the camera DSP section 20.

The media control unit 27 controls data writing and reading from the recording medium 43. The media control unit 27 writes to the recording medium 43 the image data and coded data supplied from the units of the camera DSP section 20 and reads and outputs the image data and coded data stored in the recording medium 43 to the units of the camera DSP section 20.

The subject distance measuring unit 28 generates distance information by measuring the distances to a plurality of positions of the subject. The subject distance measuring unit 28 supplies the generated distance information to the memory unit 41 and/or recording medium 43. The subject distance measuring unit 28 may have any configuration as long as it can generate distance information indicating the distances to the subject. For example, the subject distance measuring unit 28 may generate distance information by measuring the distances to a plurality of positions of the subject on the basis of the sensor signals from a range sensor using infrared light, ultrasonic wave, or the like. The subject distance measuring unit 28 may also generate distance information from the focal point of the focus lens by using the auto-focus function of the imaging apparatus. The distance information of the plurality of positions of the subject can also be generated by rotating the imaging apparatus 10. The distance information of the plurality of positions in the captured image may also be generated by using a CMOS solid-state imaging device having phase difference pixels for detecting the focuses by pupil-dividing the light from the subject as disclosed in Japanese Unexamined Patent Application Publication No. 2010-169709. The imaging device is not limited to a CMOS device and may have any configuration having phase difference pixels.

Figure 3:
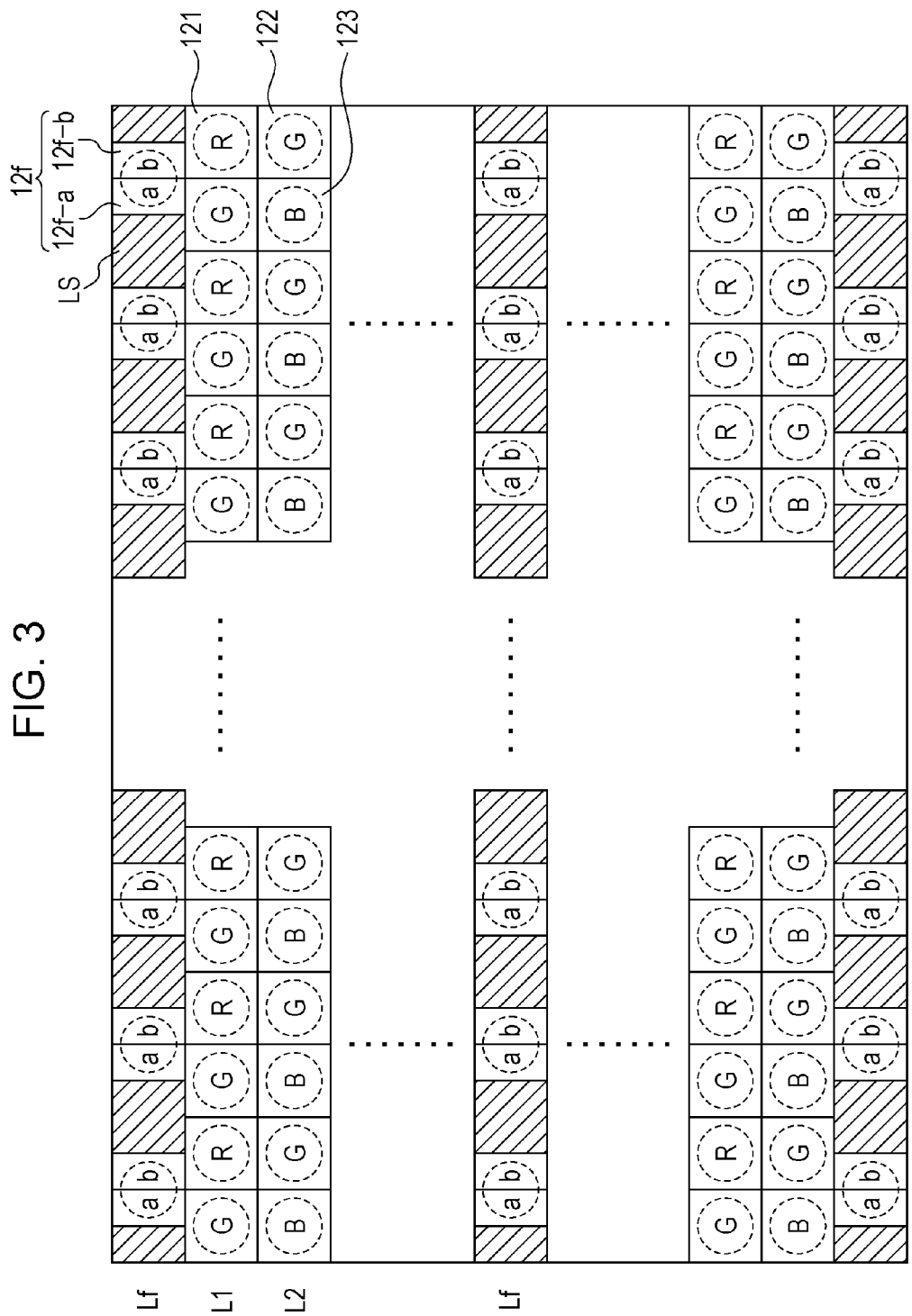
FIG. 3 shows a configuration of a CMOS solid-state imaging device having phase difference pixels.

FIG. 3 shows a configuration of a CMOS solid-state imaging device having phase difference pixels for detecting focuses by pupil-dividing the light from the subject. The imaging device 12 has a two-dimensional matrix of a plurality of pixels configured with photodiodes. Red (R) pixels 121, green (G) pixels 122, and blue (B) pixels 123 are formed with color filters with different spectral characteristics, such as red (R), green (G), and blue (B) color filters, disposed in a ratio of 1:2:1 on the light receiving surface of each pixel. Phase difference pixel pairs (referred to hereinafter as auto-focus (AF) pixel pairs) 12f are also provided to detect the focuses by pupil-dividing the light from the subject. In FIG. 3, dashed lines in the R pixels 121, G pixels 122, B pixels 123, and AF pixel pairs 12f indicate microlenses serving as the condenser lenses.

G pixels 122 and R pixels 121, which do not have the pupil-dividing function, are alternately arranged in the horizontal direction, forming horizontal lines L1, while B pixels 123 and G pixels 122 are alternately arranged in the horizontal direction, forming horizontal lines L2. The horizontal lines L1 and L2 are alternately arranged in the vertical direction, forming a Bayer array.

AF pixel pairs 12f are repeatedly arranged in the horizontal direction, forming AF lines Lf. Shaded regions are light shielding sections LS. A plurality of AF lines Lf thus configured are arranged in the vertical direction at intervals of a predetermined number of lines. The light reception data obtained at the first AF pixel 12f-a in an AF pixel pair 12f is referred to as A-series data, while the light reception data obtained at the second AF pixel 12f-b in the AF pixel pair 12f is referred to as B-series data.

Figure 4:
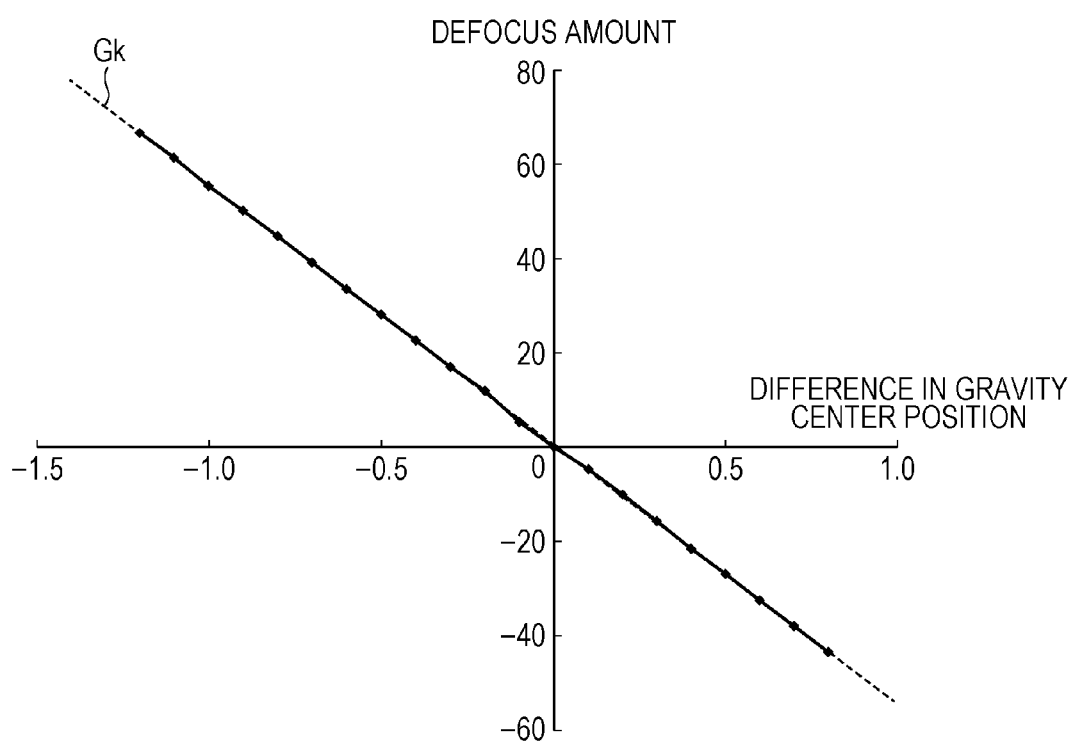
FIG. 4 illustrates the relation between the shift amount and the defocus amount.

When the A- and B-series images are compared, the amount of shift (displacement) along the AF line Lf (horizontal direction) between the A- and B-series images increases as the defocus amount increases. FIG. 4 illustrates the relation between the defocus amount and the amount of shift between the A- and B-series images. In FIG. 4, the horizontal axis indicates the difference (pixel pitch) of the position of the center of gravity of the B series image with respect to the position of the center of gravity of the A series image, while the vertical axis indicates the defocus amount (μm). The position of the center of gravity Xg is determined by equation (1) below. In equation (1), $X_1$-$X_n$ indicate the pixel positions from the left end of the AF line Lf, for example, while $Y_1$-$Y_n$ indicate the output values from the first and second AF pixels 12f-a and 12f-b at each position $X_1$-$X_n$.

$$X_g = \frac{X_1 Y_1 + X_2 Y_2 + \cdots + X_n Y_n}{Y_1 + Y_2 + \cdots + Y_n} \quad (1)$$

As shown in FIG. 4, the difference (pitch) between the positions of the centers of gravity of a pair of images is in a proportional relationship with the defocus amount (μm). This relationship is expressed by equation (2) below, where DF (μm) is the defocus amount and C (μm) is the difference between the positions of the centers of gravity. In equation (2), coefficient k indicates the tilt Gk (indicated by a dashed line in FIG. 4) which can be determined in advance in a factory test, etc.

$$DF = k \times C \quad (2)$$

As described above, the difference (phase difference) C between the positions of the centers of gravity of the A- and B-series data obtained from the AF pixel pair 12f in AF line Lf can be calculated, and the defocus amount DF can be calculated by equation (2). On the basis of the defocus amount DF thus calculated, the distances to the subject are calculated. Since the AF pixel pairs 12f are distributed on the imaging surface, the distances to the subject can be measured at a plurality of points in the imaging range.

Returning to FIG. 2, the synthesis processing unit 29 generates image data for a panoramic image using image data of a plurality of captured images read out of the camera signal processing unit 21 and/or memory unit 41, or image data of a plurality of captured images supplied from the codec unit 26. To generate image data for the panoramic image, images are clipped from a plurality of captured images and the clipped images are connected to each other.

The processing unit 30 corrects image distortions of the subject in the panoramic image due to varying distances by modifying the panoramic image on the basis of the distance information generated by the subject distance measuring unit 28. When regions without image information are produced as a result of the correction of distortions, the processing unit 30 converts the regions without image information to predetermined images.

The display unit 42 is configured with a liquid crystal display, organic EL display, or the like. Under the control of the display control unit 25, the display unit 42 displays a menu for selecting the functions to be installed in the imaging apparatus 10, the status of settings of the imaging apparatus 10, captured and/or reproduced images, etc.

The recording medium 43 may be a semiconductor memory card, a disc-shaped recording medium for magnetic or optical recording and reproducing, or the like. The recording medium 43 records the coded data generated by the codec unit 26, etc.

The operation unit 51 is connected to the system control unit 50. The operation unit 51 has operation switches and buttons provided on the imaging apparatus 10, a touch panel provided on the display screen of the display unit 42, etc., and outputs operation signals to the system control unit 50 in response to user operations.

The system control unit 50 includes a CPU (central processing unit), ROM (read only memory), RAM (random access memory), etc. The system control unit 50 reads programs stored in the ROM and executes them in the CPU to control the operations of each unit on the basis of the operation signals such that the imaging apparatus 10 operates in response to the user operations. The programs may be installed through a network such as the Internet, instead of being previously installed in the imaging apparatus 10. The programs may also be provided in various types of recording medium, such as a memory card, optical disc, and magnetic disc.

<2. Operations of the Imaging Apparatus in which the Image Processor is Employed>

Figure 5:
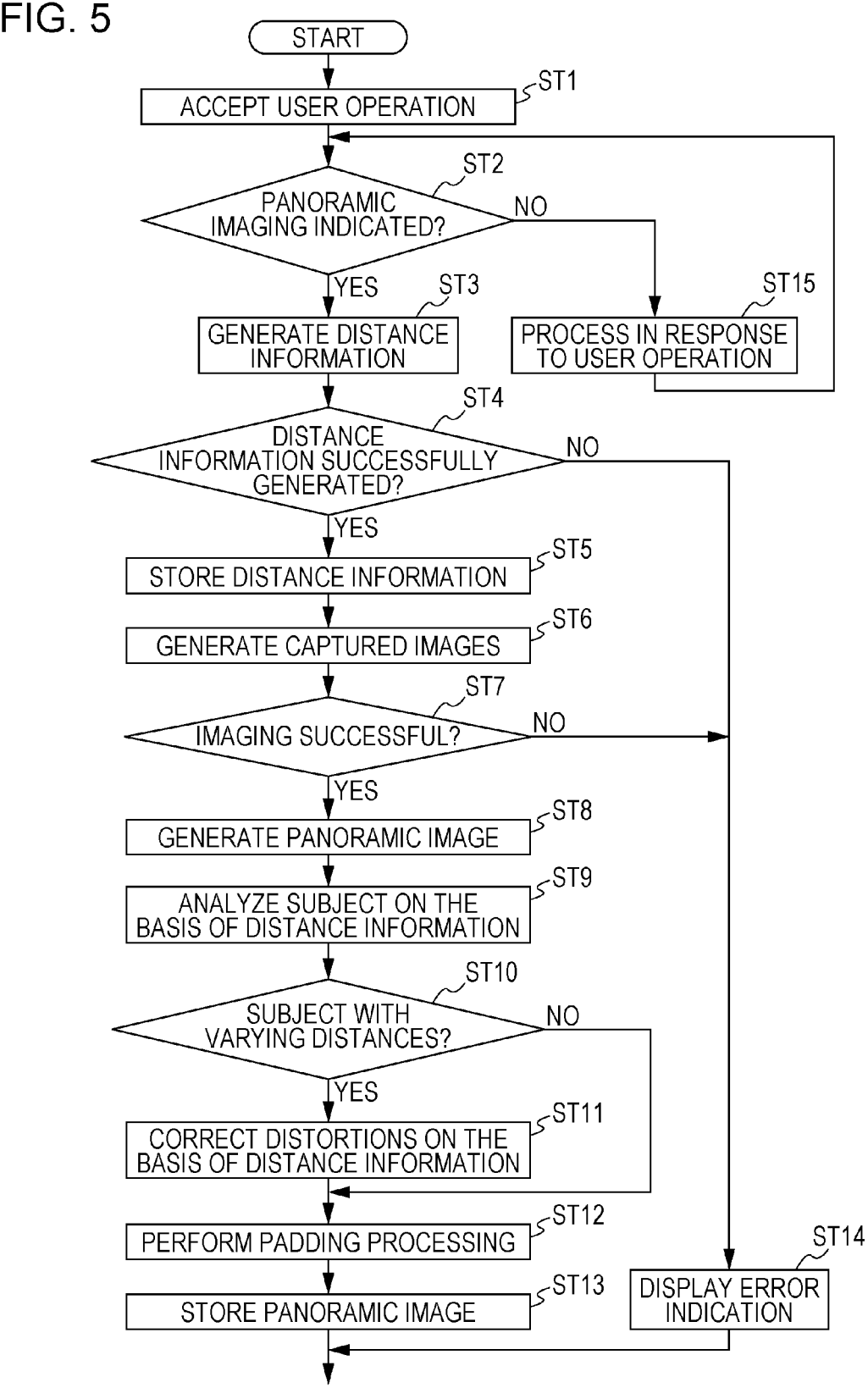
FIG. 5 is a flowchart illustrating operations of the imaging apparatus in which the image processor is employed.

FIG. 5 is a flowchart illustrating operations of the imaging apparatus in which the image processor according to an embodiment of the present technology is employed. In the operations shown in FIG. 5, the imaging apparatus generates distance information before generating a panoramic image.

In step ST1, the imaging apparatus 10 accepts a user operation. The imaging apparatus 10 accepts the user operation performed on the operation unit 51 and proceeds to step ST2.

In step ST2, the imaging apparatus 10 determines whether the accepted user operation indicates panoramic imaging. When the accepted user operation indicates panoramic imaging, the imaging apparatus 10 proceeds to step ST3. When the accepted user operation does not indicate panoramic imaging, the imaging apparatus 10 proceeds to step ST15 to perform processing in response to the user operation and then returns to step ST1.

In step ST3, the imaging apparatus 10 generates distance information. While being rotated at a fixed position, the imaging apparatus 10 generates in the subject distance measuring unit 28 distance information of a plurality of positions of the subject, before generating a plurality of captured images, and then proceeds to step ST4.

In step ST4, the imaging apparatus 10 determines whether the distance information is successfully generated. When the distance information is generated by the subject distance measuring unit 28, the imaging apparatus 10 proceeds to step ST5; when the distance information is not generated, the imaging apparatus 10 proceeds to step ST14.

In step ST5, the imaging apparatus 10 stores the distance information. The imaging apparatus 10 stores the generated distance information in the memory unit 41, for example, and then proceeds to step ST6.

In step ST6, the imaging apparatus 10 generates captured images. The imaging apparatus 10 employs the cylindrical projection method to capture a plurality of images. More specifically, the image data of a plurality of captured images to be used for the generation of a panoramic image is generated by rotating the imaging apparatus at a fixed position and the generated image data is stored in the memory unit 41, for example, and then the process proceeds to step ST7. Generating the image data of a plurality of captured images to be used for the generation of a panoramic image by rotating the imaging apparatus at a fixed position results in the captured images being generated by employing the cylindrical projection method.

In step ST7, the imaging apparatus 10 determines whether the imaging is successful. When the plurality of captured images to be used for the generation of a panoramic image are successfully generated, the imaging apparatus 10 proceeds to step ST8. When the plurality of captured images are not successfully generated because the imaging apparatus 10 is rotated too fast and the subject is partially lost when one captured image is connected to the next captured image, or because the imaging operation is stopped halfway, for example, the imaging apparatus 10 proceeds to step ST14.

In step ST8, the imaging apparatus 10 generates a panoramic image. The synthesis processing unit 29 in the imaging apparatus 10 uses the image data of the plurality of captured images to generate image data for the panoramic image by clipping images from the plurality of captured images and connecting the clipped images together. The imaging apparatus 10 stores the generated image data for the panoramic image in the memory unit 41, for example, and then proceeds to step ST9.

Figure 1A:
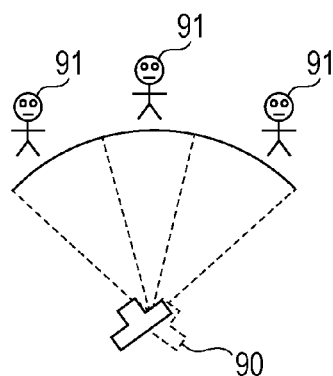
FIGS. 1A to 1D illustrate the cylindrical projection method.
Figure 1B:
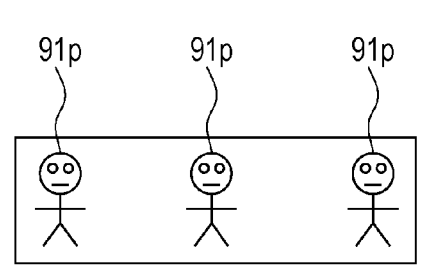
Figure 1C:
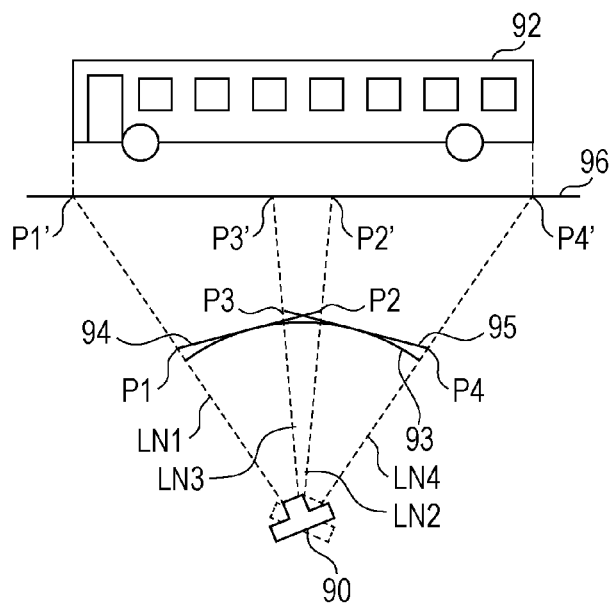
Figure 1D:
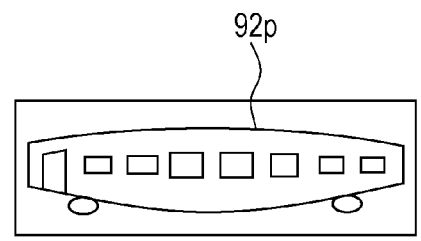

In step ST9, the imaging apparatus 10 performs subject analysis processing based on the distance information. On the basis of the stored distance information, the imaging apparatus 10 analyzes the subject in the panoramic image to determine whether the subject is located at varying distances as shown in FIG. 1C, for example, and then proceeds to step ST10.

In step ST10, the imaging apparatus 10 determines whether the subject is located at varying distances from the imaging apparatus 10. When the subject in the panoramic image is located at varying distances from the imaging apparatus 10, the imaging apparatus 10 proceeds to step ST11; when the subject is located at constant distances from the imaging apparatus 10, the imaging apparatus 10 proceeds to step ST12.

In step ST11, the imaging apparatus 10 performs distortion correction processing based on the distance information. The processing unit 30 in the imaging apparatus 10 performs distortion correction processing on the panoramic image on the basis of the distance information and then proceeds to step ST12. The distortion correction processing on the basis of the distance information will be described later in detail.

In step ST12, the imaging apparatus 10 performs padding processing. If padding areas without image information are produced as a result of the distortion correction processing based on the distance information, the processing unit 30 in the imaging apparatus 10 converts the padding areas to predetermined images and then proceeds to step ST13.

In step ST13, the imaging apparatus 10 stores the panoramic image. The imaging apparatus 10 stores the panoramic image that has undergone the distortion correction and/or padding processing, in the memory unit 41 and/or recording medium 43, for example. If the image data of the panoramic image is compressed and coded by the codec unit before the panoramic image is stored, the amount of stored data of the panoramic image can be reduced.

In step ST14, the imaging apparatus 10 gives error indication. When the panoramic image is not successfully generated or distortions are not successfully corrected on the basis of the distance information, the imaging apparatus 10 displays an error indication on the display unit 42.

FIG. 5 illustrates exemplary operations of the imaging apparatus in which the image processor according to the present embodiment of this technology is employed. In this flowchart, steps ST1, ST2, and ST12-ST15 may be omitted by the image processor of the present embodiment.

Figure 6A:
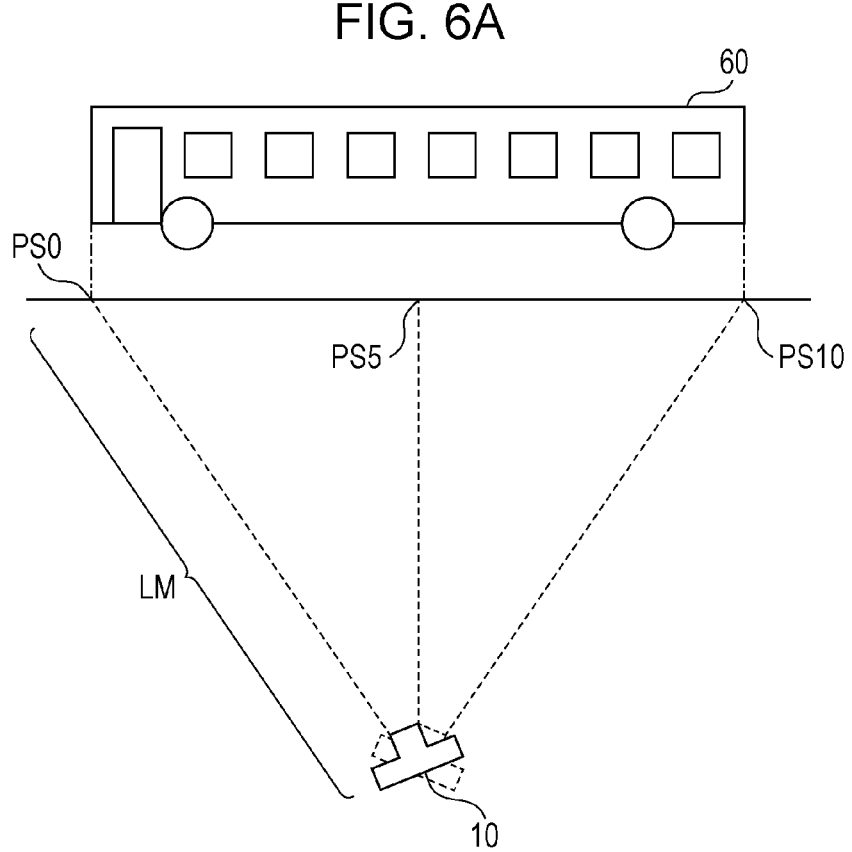
FIGS. 6A and 6B illustrate distances between an imaging apparatus and a subject when the cylindrical projection method is employed.
Figure 6B:
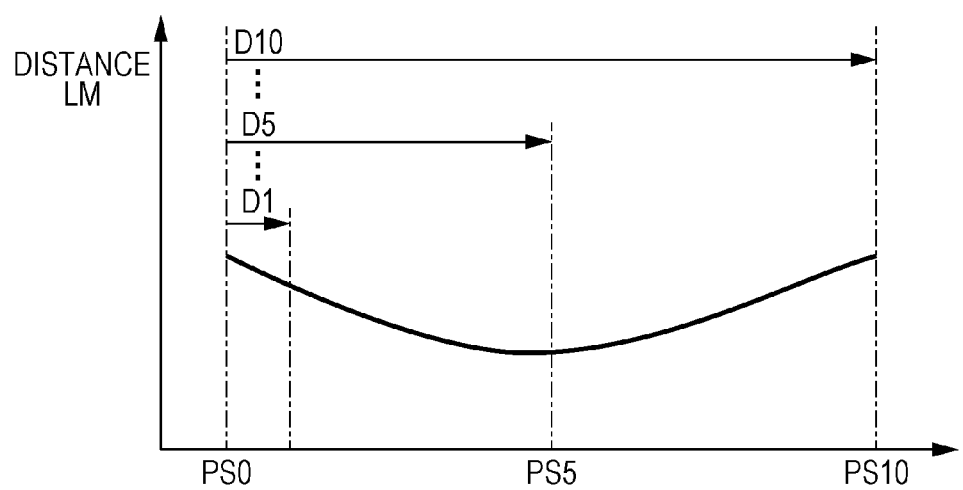

The distortion correction processing based on the distance information will now be described. FIGS. 6A and 6B show distances between an imaging apparatus and a subject when the cylindrical projection method is employed. When the imaging apparatus 10 is rotated at a fixed position as shown in FIG. 6A, the distance LM between the imaging apparatus 10 and a large planar subject 60 varies as shown in FIG. 6B in the rotation direction, that is the direction in which clipped images are connected together to generate a panoramic image. The imaging apparatus 10 may be rotated at a fixed position using as the axis of rotation the position of the imaging apparatus itself as shown in FIG. 6A or by rotating at a fixed position the body of the user holding the imaging apparatus.

FIG. 7 illustrates the distances LM between the imaging apparatus 10 and the subject 60 at positions PS0-PS10. For example, the distance is 10 at position PS0 and the distance decreases as the imaging direction of the imaging apparatus 10 is moved toward the center of the subject 60, becoming 5 at position PS5. As the imaging direction of the imaging apparatus 10 is further moved toward the right end of the subject 60, the distance further increases and becomes 10 at position PS10. In FIGS. 6A to 8, D1-D10 indicates the distances from position PS0.

The processing unit 30 corrects the image distortions due to varying distances by modifying, i.e., reducing or enlarging, the image on the basis of the distance information. When reducing the images on the basis of the distance information, the processing unit 30 corrects the image distortions due to varying distances by increasing the reduction ratio from the reduction ratio 100% (no reduction) for the position at the longest distance LM(max) as the distance LM becomes shorter from the longest distance LM(max). The reduction ratio n is set using equation (3) below:

$$n = LM/LM(\text{max}) \times 100\% \qquad (3)$$

Figure 8:
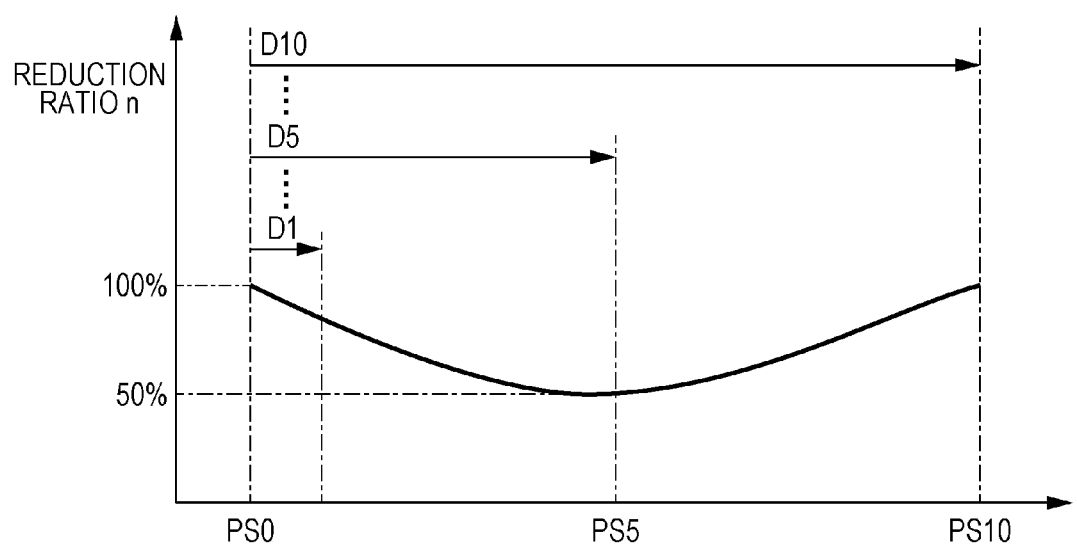
FIG. 8 shows exemplary reduction ratios for image reduction based on distance information.

FIG. 8 illustrates reduction ratios n for the image reduction based on the distance information. The position PS0 is located at the most distant point, i.e., the longest distance LM(max) (=10), so the reduction ratio is 100% (no reduction). As the distance LM decreases, the reduction ratio is increased to reduce the image. At position PS5 located at the shortest distance LM(min) (=5), the reduction ratio is LM(min)/LM(max)×100=50%. As the distance increases, the reduction ratio is decreased and becomes 100% at position PS10 located at the longest distance LM(max).

Figure 9A:
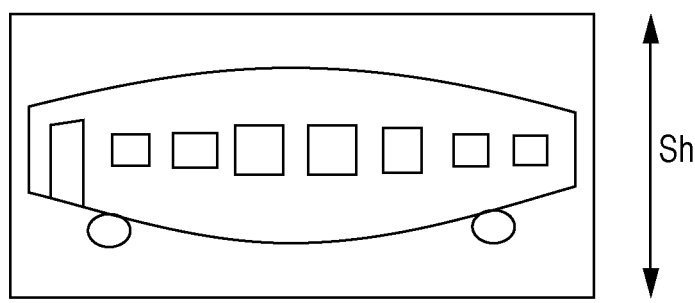
FIGS. 9A and 9B illustrate distortion correction processing performed in a processing unit.
Figure 9B:
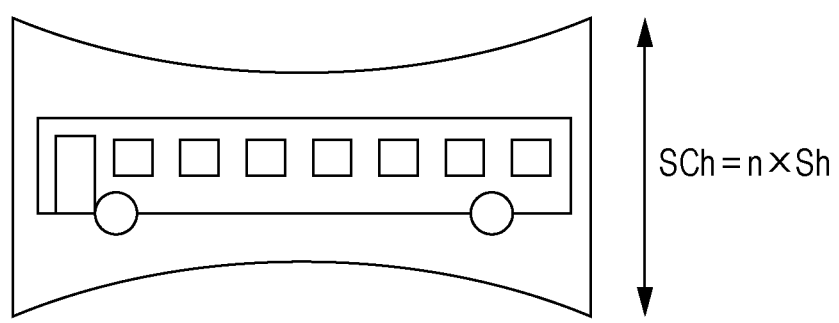

FIGS. 9A and 9B illustrate the distortion correction processing performed in the processing unit 30. The processing unit 30 corrects image distortions by reducing the panoramic image by the reduction ratios determined in accordance with the distances to the subject on the basis of the distance information. For example, a panoramic image with image distortions corrected as shown in FIG. 9B is generated by reducing the image in accordance with the distances to the subject by conducting the calculation in equation (4) below, where "Sh" is the image size in the direction orthogonal to the longitudinal direction of the panoramic image as shown in FIG. 9A.

$$SCh = n \times Sh \qquad (4)$$

Figure 10A:
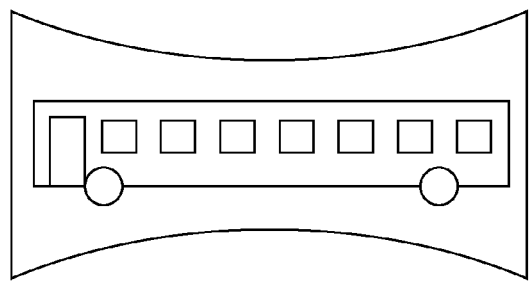
FIGS. 10A to 10E illustrate image processing performed by the processing unit after the distortion correction processing is completed.
Figure 10B:
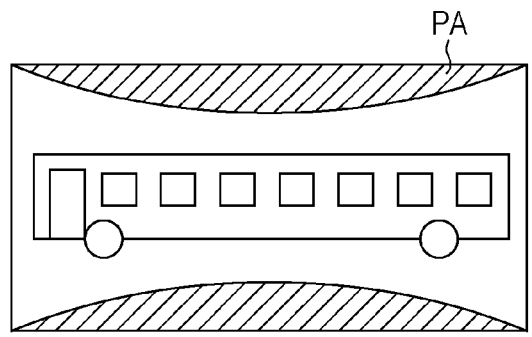

FIGS. 10A to 10E illustrate the image processing performed by the processing unit 30 after the distortions are corrected. After the processing unit 30 corrects distortions by reducing the image, padding areas PA (shaded areas) without image information are produced as shown in FIG. 10A. The processing unit 30 converts the padding areas PA to predetermined images. The processing unit 30 fills the padding areas with a predetermined color CP as shown in FIG. 10B, for example. Alternatively, the processing unit 30 may modify the images in the regions adjacent to the padding areas PA and paste the modified images to the padding areas PA.

Figure 10C:
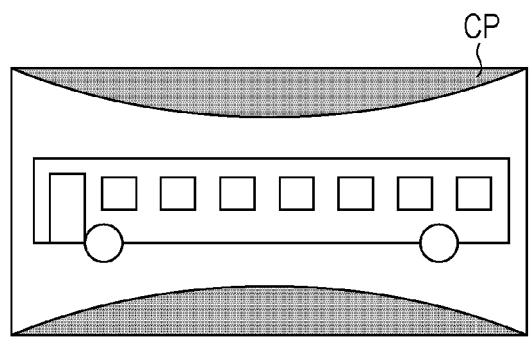
Figure 10D:
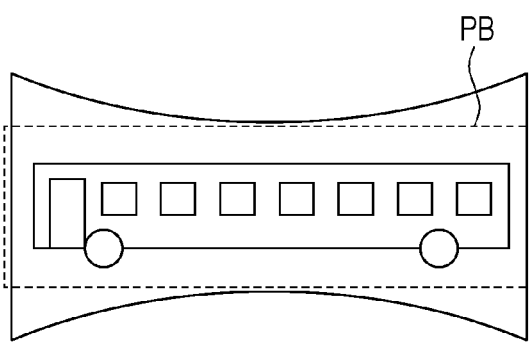
Figure 10E:
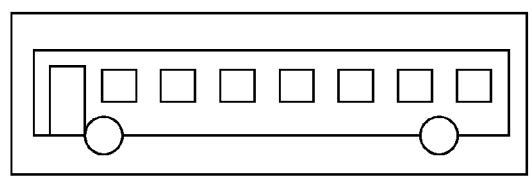

Instead, the processing unit 30 may clip from the panoramic image with distortions corrected shown in FIG. 10C a rectangular region PB excluding the padding areas PA and use the clipped rectangular region PB as the panoramic image as shown in FIG. 10D.

Alternatively, the processing unit 30 may generate a panoramic image with distortions corrected by increasing the enlargement ratio of the panoramic image as the distance information becomes longer from the shortest distance. In this case, n indicates the enlargement ratio in equation (3) where the LM(max) is replaced with LM(min).

When the panoramic image is reduced in accordance with the distances to the subject, the image quality of the portions distant from the imaging apparatus 10 is maintained in the entire panoramic image with distortions corrected. On the other hand, when the panoramic image is enlarged in accordance with the distances to the subject, the image quality of the portions near the imaging apparatus 10 is maintained in the entire panoramic image with distortions corrected.

In this manner, image distortions due to varying distances from the imaging apparatus are corrected by reducing or enlarging the panoramic image in accordance with the distance information. Accordingly, a panoramic image with an undistorted subject image therein can be generated easily.

In the operations shown in FIG. 5, the distance information is obtained before the imaging operations are performed; if a CMOS solid-state imaging device having phase difference pixels is used as described above, the distance information can be generated while the image data of the captured images is being generated.

<3. Other Operations of the Imaging Apparatus in which the Image Processor is Employed>

Referring now to the flowchart in FIG. 11, other operations of the imaging apparatus in which the image processor according to the present embodiment of this technology is employed will be described. In this case, the distance information is generated while image data of a plurality of captured images is being generated employing the cylindrical projection method.

In step ST21, the imaging apparatus 10 accepts a user operation. The imaging apparatus 10 accepts the user operation performed on the operation unit 51 and then proceeds to step ST22.

In step ST22, the imaging apparatus 10 determines whether the accepted user operation indicates panoramic imaging. When the accepted user operation indicates panoramic imaging, the imaging apparatus 10 proceeds to step ST23. When the accepted user operation does not indicate panoramic imaging, the imaging apparatus 10 proceeds to step ST35 to perform processing in response to the user operation and then returns to step ST21.

In step ST23, the imaging apparatus 10 generates a captured image. After generating one captured image, the imaging apparatus 10 proceeds to step ST24.

In step ST24, the imaging apparatus 10 generates distance information. The imaging apparatus 10 generates distance information in the subject distance measuring unit 28 in accordance with the distance to the subject imaged in step ST23 and then proceeds to step ST24.

In step ST25, the imaging apparatus 10 stores the captured image and the distance information. The imaging apparatus 10 stores in the memory unit 41, for example, the image data of the captured image generated in step ST23 and the distance information generated in step ST24 and then proceeds to step ST26.

In step ST26, the imaging apparatus 10 determines whether the imaging has ended. When the imaging is determined to have ended, the imaging apparatus 10 proceeds to step ST27. When the imaging is not determined to have ended, the imaging apparatus 10 returns to step ST23 to generate a captured image at another rotated position. The imaging apparatus 10 determines that the imaging has ended when the user performs a shutter stop operation, or when a predetermined number of captured images have been generated, or when the rotational motion of the imaging apparatus 10 is completed, for example. Generating the image data of a plurality of captured images to be used for panoramic image generation by rotating the imaging apparatus at the fixed position results in the captured images being generated by employing the cylindrical projection method.

In step ST27, the imaging apparatus 10 determines whether the imaging is successful. When the plurality of captured images to be used for the generation of a panoramic image are successfully generated, the imaging apparatus 10 proceeds to step ST28. When the plurality of captured image are not successfully generated because the imaging apparatus 10 has been rotated too fast and the subject is partially lost when one captured image is connected to the next captured image, or because the imaging operation is stopped halfway, for example, the imaging apparatus 10 proceeds to step ST34. In step ST28, the imaging apparatus 10 generates a panoramic image. The synthesis processing unit 29 in the imaging apparatus 10 generates image data for the panoramic image using the image data of the plurality of captured images by clipping images from the plurality of captured images and connecting the clipped images together. The imaging apparatus 10 stores the generated image data for the panoramic image in the memory unit 41, for example, and then proceeds to step ST29.

In step ST29, the imaging apparatus 10 performs subject analysis processing based on the distance information. On the basis of the stored distance information, the imaging apparatus 10 analyzes the subject in the panoramic image to determine whether the subject is located at varying distances, and then proceeds to step ST30.

In step ST30, the imaging apparatus 10 determines whether the subject is located at varying distances from the imaging apparatus 10. When the subject in the panoramic image is located at varying distances from the imaging apparatus 10, the imaging apparatus 10 proceeds to step ST31; when the subject is located at constant distances from the imaging apparatus 10, the imaging apparatus 10 proceeds to step ST32.

In step ST31, the imaging apparatus 10 performs distortion correction processing based on the distance information. The processing unit 30 in the imaging apparatus 10 performs the distortion correction processing on the panoramic image on the basis of the distance information and then proceeds to step ST32.

In step ST32, the imaging apparatus 10 performs padding processing. If padding areas without image information are produced as a result of the distortion correction processing based on the distance information, the processing unit 30 in the imaging apparatus 10 converts the padding areas to predetermined images and then proceeds to step ST33.

In step ST33, the imaging apparatus 10 stores the panoramic image. The imaging apparatus 10 stores in the memory unit 41 and/or recording medium 43, for example, the panoramic image that has undergone the distortion correction and/or padding processing. If the image data for the panoramic image is compressed and coded by the codec unit before the panoramic image is stored, the amount of stored data for the panoramic image can be reduced.

In step ST34, the imaging apparatus 10 gives error indication. When the imaging apparatus 10 fails to generate a panoramic image or correct distortions on the basis of the distance information, the imaging apparatus 10 displays an error indication on the display unit 42.

Figure 11:
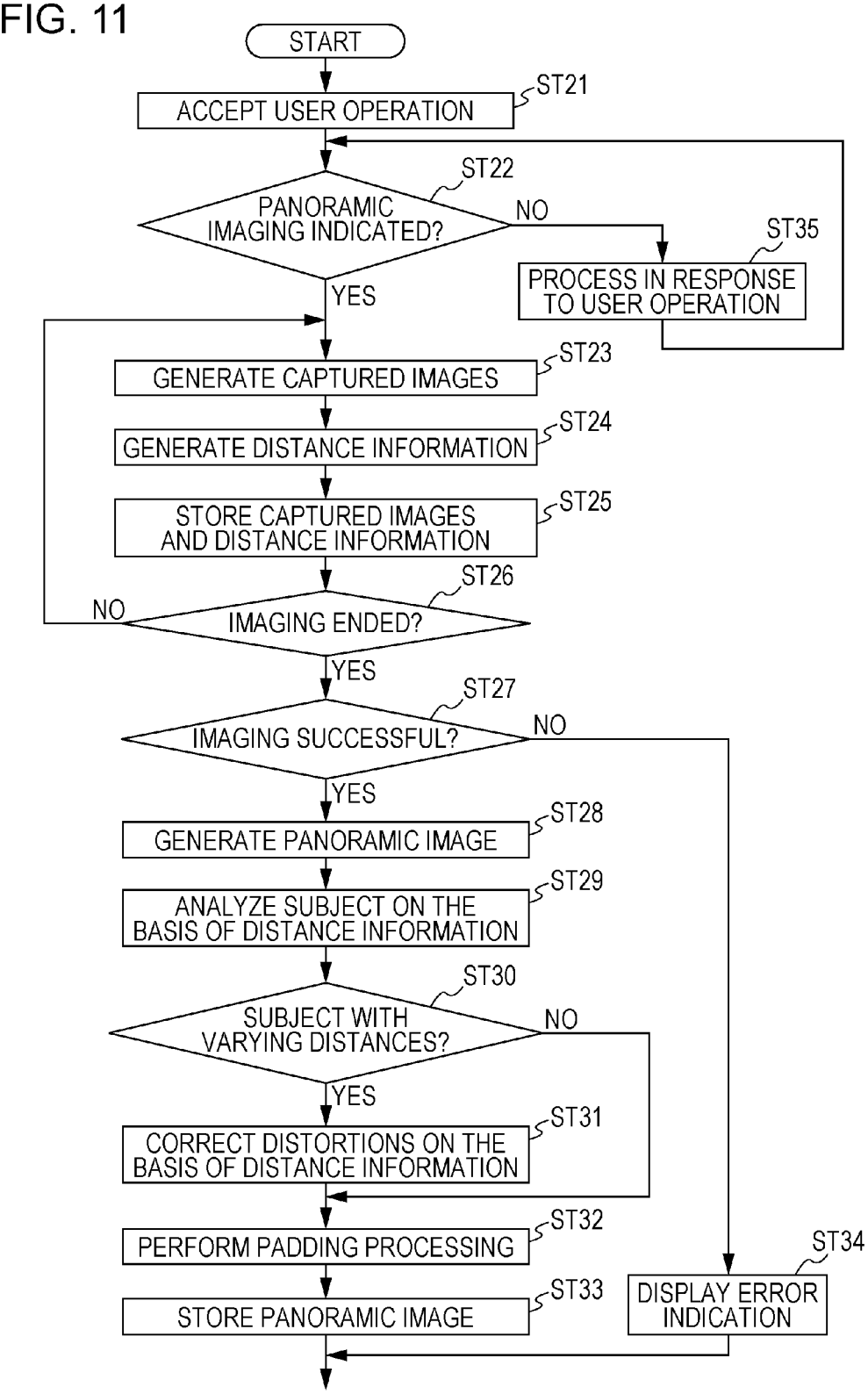
FIG. 11 is a flowchart illustrating other operations of the imaging apparatus in which the image processor is employed.

FIG. 11 illustrates exemplary operations of the imaging apparatus in which the image processor according to the present embodiment of this technology is employed. In this flowchart, steps ST21, ST22, and ST32-ST35 may be omitted by the image processor according to the present embodiment.

Since the distance information can be generated while the captured images are being generated, it is possible to generate more easily and quickly a panoramic image in which image distortions due to varying distances from the imaging apparatus have been corrected.

The processing sequence described in this specification may be implemented by hardware, software, or a combination thereof. When the processing is implemented by software, a program with the processing sequence recorded therein is installed in memory in a computer built in a dedicated hardware and is executed by the computer. The program may be installed in and executed by a general-purpose computer capable of executing various types of processing.

The program can be recorded in a recording medium such as a hard disk or ROM (read only memory). Alternatively, the program can be stored (recorded) temporarily or permanently in a removable recording medium such as a flexible disc, CD-ROM (compact disc read only memory), MO (magneto optical) disc, DVD (digital versatile disc), magnetic disc, or semiconductor memory. Such a removable recording medium can be provided as the so-called packaged software.

Instead of being installed from the above-mentioned removable recording medium to the computer, the program may be transmitted by a wireless connection from a download site to the computer or transmitted by a wired connection through a network, such as a LAN (local area network) or the Internet, to the computer. The computer can receive and install the transmitted program in a recording medium such as a built-in hard disk, etc.

In the above embodiments, distortions are corrected at the time of imaging; distortions may be corrected instead in response to a user indication at the time of reproduction of the panoramic image. Alternatively, both an uncorrected panoramic image and the corresponding corrected panoramic image may be displayed on the display unit 42 so as to be selected by a user operation on the operation unit 51 and the image data of the selected panoramic image may be recorded. The display unit 42 may be configured only with a function for displaying the corrected panoramic image on the display unit 42. Furthermore, image data of both the uncorrected panoramic image and the corrected panoramic image may be recorded in the memory unit 41 and/or recording medium 43.

The distance information and the image signal may be recorded independently of each other, or the distance information may be contained in an image signal file. The distance information may be contained in a tag of an Exif file, for example.

In the embodiments described above, the image processor is applied in the imaging apparatus. Alternatively, the imaging apparatus and the signal processor may be configured independently of each other. In this case, the imaging apparatus would generate a plurality of captured images employing the cylindrical projection method and generate distance information in accordance with the distances to the subject. On the other hand, the image processor would generate a panoramic image and correct distortions using the image data of the captured images and distance information generated by the imaging apparatus.

It is obvious to those skilled in the art that the embodiments of the present technology disclose the present technology by way of example only and modifications and substitutions may be made to these embodiments without departing from the scope and spirit of the present technology. That is, the substance of the present technology should be judged according to the embodiments of the present technology.

The present technology may also adopt any one of the following configurations:

(1) An image processor including:
a synthesis processing unit that generates a synthetic image by clipping images from a plurality of captured images and connecting the clipped images together; and
a processing unit that corrects image distortions of the subject in the panoramic image due to varying distances to the subject by modifying the panoramic image on the basis of distance information obtained by measuring the distances to a plurality of positions of the subject.

(2) The image processor according to item (1), wherein the plurality of captured images are generated by capturing the images employing the cylindrical projection method.

(3) The image processor according to item (1) or (2), wherein the plurality of positions are located in the direction in which the clipped images are connected together.

(4) The image processor according to any one of items (1) to (3), wherein the processing unit corrects the image distortions by reducing or enlarging the panoramic image in accordance with the distances to the subject on the basis of the distance information.

(5) The image processor according to item (4), wherein the processing unit increases a reduction ratio of the panoramic image as the distance information becomes shorter from the longest distance.

(6) The image processor according to item (4) or (5), wherein the processing unit converts the regions without image information produced as a result of the reduction of the panoramic image to predetermined images.

(7) The image processor according to item (4) or (5), wherein the processing unit clips from the reduced panoramic image a rectangular image excluding the regions without image information produced as a result of the reduction of the panoramic image.

(8) The image processor according to item (4), wherein the processing unit increases an enlargement ratio of the panoramic image as the distance information becomes longer from the shortest distance.

(9) The image processor according to any one of items (1) to (8), including:
a display unit adapted to display images;
wherein the panoramic image and the panoramic image with distortions corrected are displayed on the display unit such that either one of the panoramic images can be selected.

The present disclosure contains subject matter related to that disclosed in Japanese Priority Patent Application JP 2011-062175 filed in the Japan Patent Office on Mar. 22, 2011, the entire contents of which are hereby incorporated by reference.

What is claimed is:

1. An image processing apparatus comprising:
a central processing unit (CPU) operable to:
generate a panoramic image by clipping images from a plurality of captured images and connecting the clipped images together; and
correct image distortions of a subject in the panoramic image by modifying the panoramic image based on distance corresponding to each of a plurality of positions of the subject in the panoramic image.

2. The image processing apparatus according to claim 1, wherein the plurality of captured images are generated by imaging the subject employing a cylindrical projection method.

3. The image processing apparatus according to claim 1, wherein each of the plurality of positions of the subject is located in a direction in which the clipped images are connected together.

4. The image processing apparatus according to claim 1, wherein the CPU is further operable to correct the image distortions by reducing or enlarging the panoramic image in accordance with the distance corresponding to each of the plurality of positions of the subject in the panoramic image.

5. The image processing apparatus according to claim 4, wherein the CPU is further operable to increase a reduction ratio of the panoramic image as the distance corresponding to each of the plurality of positions of the subject becomes shorter from a longest distance.

6. The image processing apparatus according to claim 5, wherein the CPU is further operable to convert a region without image information produced as a result of the reduction of the panoramic image to a predetermined image.

7. The image processing apparatus according to claim 5, wherein the CPU is further operable to clip from the reduced panoramic image, a rectangular image excluding a region without image information produced as a result of the reduction of the panoramic image.

8. The image processing apparatus according to claim 1, wherein the CPU is further operable to increase an enlargement ratio of the panoramic image as the distance corresponding to each of the plurality of positions of the subject becomes longer from a shortest distance.

9. The image processing apparatus according to claim 1, further comprising:
a display unit operable to display images,
wherein the panoramic image and the panoramic image with distortions corrected are displayed on the display unit to allow either one of the panoramic images to be selected.

10. An image processing method comprising:
generating a panoramic image by clipping images from a plurality of captured images and connecting the clipped image together; and
correcting image distortions of a subject in the panoramic image by modifying the panoramic image based on distance corresponding to each of a plurality of positions of the subject in the panoramic image.

11. A non-transitory computer readable storage medium having stored thereon, instructions causing a computer to perform image processing for generating a panoramic image from a plurality of captured images, the instructions comprising:
generating a panoramic image by clipping images from a plurality of captured images and connecting the clipped images together; and
correcting image distortions of a subject in the panoramic image by modifying the panoramic image based on distance corresponding to each of a plurality of positions of the subject in the panoramic image.

12. An imaging apparatus comprising:
a central processing unit (CPU) operable to:
generate a synthetic image by clipping images from a plurality of captured images and synthesizing the clipped images together;
measure distance corresponding to each of a plurality of positions of a subject in the synthesized image; and
correct image distortions of the subject in the synthesized image by modifying the synthesized image based on the measured distance corresponding to each of the plurality of positions of the subject in the synthesized image.

13. The imaging apparatus according to claim 12, wherein the plurality of captured images are generated by imaging the subject employing a cylindrical projection method.

14. The imaging apparatus according to claim 12, wherein each of the plurality of positions of the subject is located in a direction in which the clipped images are synthesized together.

15. The imaging apparatus according to claim 12, wherein the distance corresponding to each of the plurality of positions of the subject is measured by rotating the imaging apparatus along a fixed position.

16. The imaging apparatus according to claim 12, wherein the distance corresponding to each of the plurality of positions of the subject is measured before capturing the plurality of captured images.

17. The imaging apparatus according to claim 12, further comprising a range sensor to measure the distance corresponding to each of the plurality of positions of the subject.

18. The imaging apparatus according to claim 12, wherein the CPU is operable to measure the distance corresponding to each of the plurality of positions of the subject based on a focal point of a focus lens of the imaging apparatus by using an auto-focus function of the imaging apparatus.

19. The imaging apparatus according to claim 12, further comprises a CMOS solid-state imaging device having phase difference pixels for detecting focus by pupil-dividing the light from the subject to measure the distance corresponding to each of the plurality of positions of the subject.

20. The image processing apparatus according to claim 1, wherein the distance corresponding to each of the plurality of positions of the subject is a distance from an imaging apparatus to a plurality of points on the subject along a direction in which the clipped images are connected together.

\* \* \* \* \*